(12) United States Patent
Yang

(10) Patent No.: US 10,891,483 B2
(45) Date of Patent: Jan. 12, 2021

(54) TEXTURE CLASSIFICATION OF DIGITAL IMAGES IN AERIAL INSPECTION

(71) Applicant: The Boeing Company, Chicago, IL (US)

(72) Inventor: Yan Yang, Brisbane (AU)

(73) Assignee: The Boeing Company, Chicago, IL (US)

( * ) Notice: Subject to any disclaimer, the term of this patent is extended or adjusted under 35 U.S.C. 154(b) by 119 days.

(21) Appl. No.: 16/377,956

(22) Filed: Apr. 8, 2019

(65) Prior Publication Data

US 2020/0320293 A1    Oct. 8, 2020

(51) Int. Cl.
| | |
|---|---|
| *G06K 9/00* | (2006.01) |
| *G06K 9/32* | (2006.01) |
| *G06T 11/00* | (2006.01) |
| *G06K 9/62* | (2006.01) |
| *B64C 39/02* | (2006.01) |

(52) U.S. Cl.
CPC ........ *G06K 9/00657* (2013.01); *B64C 39/024* (2013.01); *G06K 9/3233* (2013.01); *G06K 9/6256* (2013.01); *G06T 11/001* (2013.01); *B64C 2201/123* (2013.01); *B64C 2201/127* (2013.01); *G06T 2207/10032* (2013.01); *G06T 2207/20081* (2013.01)

(58) Field of Classification Search
CPC ............. G06K 9/00657; G06K 9/3233; G06K 9/6256; B64C 39/024; B64C 2201/123; B64C 2201/127; G06T 11/001; G06T 2207/10032; G06T 2207/20081
USPC ....................................................... 358/154
See application file for complete search history.

(56) References Cited

U.S. PATENT DOCUMENTS

| | | | |
|---|---|---|---|
| 8,140,200 B2 | 3/2012 | Heppe et al. | |
| 9,477,226 B2 | 10/2016 | Olson et al. | |
| 10,274,958 B2* | 4/2019 | DelMarco | G06F 16/51 |
| 2013/0038717 A1 | 2/2013 | Reynolds et al. | |
| 2014/0064554 A1* | 3/2014 | Coulter | G06T 7/33 |
| | | | 382/103 |

(Continued)

OTHER PUBLICATIONS

Andrearczyk, Vincent and Paul F. Whelan; "Convolutional neural network on three orthogonal planes for dynamic texture classification", 2017, arXiv 1703.05530v1.

(Continued)

*Primary Examiner* — Jerome Grant, II
(74) *Attorney, Agent, or Firm* — Duft & Bornsen, PC

(57) ABSTRACT

Unmanned aerial inspection systems and associated methods. In one embodiment, an aerial platform (e.g., an Unmanned Aerial Vehicle (UAV)) navigates to a location of a geographic region, and captures a digital image of the geographic region with an imaging device. The aerial platform segments the digital image into superpixels, selects a region of interest from the digital image to define one or more patches associated with the superpixels, assigns terrain texture categories to the patches, and assigns the terrain texture categories to the superpixels based on the terrain texture categories of the patches to generate a texture classified representation of the digital image. The aerial platform determines whether a site contamination is present at the geographic region based on the texture classified representation of the digital image, and reports an alert upon identifying that the site contamination is present.

20 Claims, 11 Drawing Sheets

(56) References Cited

U.S. PATENT DOCUMENTS

| | | | |
|---|---|---|---|
| 2017/0075359 A1* | 3/2017 | Wang | G05D 1/0676 |
| 2017/0076438 A1* | 3/2017 | Kottenstette | G06K 9/627 |
| 2017/0250751 A1* | 8/2017 | Kargieman | G06K 9/0063 |
| 2018/0089843 A1* | 3/2018 | Miecznik | G06T 7/207 |
| 2020/0226352 A1* | 7/2020 | Coulter | G06T 7/37 |

OTHER PUBLICATIONS

Andrearczyk, Vincent and Paul F. Whelan; "Texture segmentation with fully convolutional networks"; 2017, arXiv 1703.05230v1.

Bunte, Kerstin et al; "Adaptive matrices for color texture classification"; International Conference on Computer Analysis of Images and Patterns; 2011, Springer, Berlin, Heidelberg.

Holder, Christopher J. et al; "From on-road to off: transfer learning within a deep convolutional neural network for segmentation and classification of off-road scenes"; 2016, European Conference on Computer Vision, Springer, Cham.

Li, Hongguang et al; "Superpixel-Based Feature for Aerial Image Scene Recognition"; 2018, Sensors 2018, 18, 156.

Jain, Anil K and Farshid Farrokhnia; "Unsupervised texture segmentation using Gabor filters"; 1991, Pattern recognition 24.12, 1167-1186.

Jobanputra, Rishi and David A. Clause; "Preserving boundaries for image texture segmentation using grey level co-occurring probabilities"; 2006, Pattern Recognition 39.2, 234-245.

Li, Jiang et al; "Texture analysis of remote sensing imagery with clustering and Bayesian inference"; 2015, I.J. Image, Graphics and Signal Processing, 9, 1-10.

Tang, Lie et al; "Classification of Broadleaf and Grass Weeds Using Gabor Wavelets and an Artificial Neural Network"; 2003, Transactions of the ASAE, 46.4, 1247-1254.

Qin, Lei et al; "Unsupervised texture classification: Automatically discover and classify texture patterns"; 2008, Image and Vision Computing 26.5, 647-656.

Wieschollek, Patrick and Hendrik Lensch; "Transfer Learning for Material Classification using Convolutional Networks", 2016, arXiv 1609.06188.

Zhang, Ligang and Brijesh Verma: "Superpixel based Class-Semantic Texton occurrences for Natural Roadside Vegetation Segmentation"; 2017, Machine Vision and Applications 28.3-4, 293-311.

\* cited by examiner

TEXTURE CLASSIFICATION OF DIGITAL IMAGES IN AERIAL INSPECTION

FIELD

This disclosure relates to the field of image analysis, and more particularly, to image analysis of aerial images.

BACKGROUND

Image analysis is the extraction of meaningful information from images, which leads to an automated classification and the perception of the information. Image analysis may be used for inspection of geographic regions to identify features on the ground from aerial captures. The inspection of a remote geographic region is often carried out by unmanned missions, utilizing remotely-piloted aircraft systems. Traditional inspection of geographic regions, such as for vegetation encroachment, was done with remote sensing, such as using Normalized Difference Vegetation Index (NDVI) to detect green vegetation based on image captures using red and Near-Infrared (NIR) bands. More accurate identification of the material of the scanned region may need the capture of its spectral signature, requiring hyperspectral or multispectral imaging sensors onboard the remote sensing platform. However, these and/or other inspection techniques may be processing-intensive and may require multiple and complex imaging devices.

SUMMARY

Embodiments described herein provide aerial inspection of geographic regions to analyze the textures of the geographic regions. Using models learned from the visual information of a catalog of textures, the analysis provides the classification of textures in the geographic regions, such as for the detection and alert of vegetation encroachment, soil contamination, erosion, or other types of contamination. In the embodiments described herein, an aerial platform is used to capture one or more digital images of a geographic region. Image analysis is then performed on the digital image to classify the pixels of the digital image. The image analysis includes image segmentation, where the digital image is partitioned into multiple segments or superpixels. The image analysis further includes patch classification, where patches of the digital image are assigned a terrain texture category, and then the superpixels are assigned a terrain texture category based on the terrain texture category of the patch(es) in the superpixels. Based on the classification of the superpixels, the aerial platform is able to detect contamination at the geographic region, such as vegetation encroachment, soil contamination, erosion, etc. The image analysis technique set forth herein allows for pixel-to-pixel classification of the digital image with limited training data. Also, the image analysis technique is less processing-intensive, which means that processing may be performed onboard an aircraft. Further, the image analysis technique does not require multispectral imaging, which lowers the operation cost.

One embodiment comprises an unmanned aerial inspection system that includes an aerial platform, such as a rotary-wing Unmanned Aerial Vehicle (UAV), a fixed-wing UAV, etc. The aerial platform comprises an imaging device, and one or more processors and memory that navigate the aerial platform to a location of a geographic region, and capture a digital image of the geographic region with the imaging device while the aerial platform is airborne. The processor(s) and memory segment the digital image into superpixels, select a region of interest from the digital image to define one or more patches associated with the superpixels, assign terrain texture categories to the patches, and assign the terrain texture categories to the superpixels based on the terrain texture categories of the patches to generate a texture classified representation of the digital image. The processor(s) and memory determine whether a site contamination is present at the geographic region based on the texture classified representation of the digital image, and report an alert upon determining that the site contamination is present.

In another embodiment, the processor(s) and memory designate one or more of the terrain texture categories as a site contamination category, identify a percentage of the superpixels in the texture classified representation that are assigned the site contamination category, and determine that the site contamination is present at the geographic region when the percentage exceeds a threshold.

In another embodiment, the processor(s) and memory designate one or more of the terrain texture categories as a site contamination category, identify a total number of the superpixels in the texture classified representation that are assigned the site contamination category, and determine that the site contamination is present at the geographic region when the total number exceeds a threshold.

In another embodiment, the processor(s) and memory assign the terrain texture categories to the superpixels by performing, for each individual superpixel of the superpixels, the functions of: identifying pixels in the individual superpixel that belong to at least one of the patches, identifying one or more of the terrain texture categories assigned to each of the pixels, and assigning one of the terrain texture categories that is assigned to a majority of the pixels as a terrain texture category for the individual superpixel.

In another embodiment, the terrain texture categories are assigned to the patches based on a patch classification model. The processor(s) and memory present one or more test images to a user, receive input from the user indicating areas in the test images as test patches, receive input from the user assigning one of the terrain texture categories to the test patches, and train the patch classification model based on the test patches.

In another embodiment, the site contamination comprises vegetation encroachment, and the terrain texture categories include at least a high vegetation category and a vegetation-free category. The processor(s) and memory receive input from the user indicating first areas of concentrated vegetation within the test images as first test patches, and receive input from the user assigning the high vegetation category to the first test patches. The processor(s) and memory receive input from the user indicating second areas of non-vegetation within the test images as second test patches, and receive input from the user assigning the vegetation-free category to the second test patches.

In another embodiment, the site contamination comprises erosion, and the terrain texture categories include at least a high erosion category and an erosion-free category. The processor(s) and memory receive input from the user indicating first areas of concentrated erosion within the test images as first test patches, and receive input from the user assigning the high erosion category to the first test patches. The processor(s) and memory receive input from the user indicating second areas of non-erosion within the test images as second test patches, and to receive input from the user assigning the erosion-free category to the second test patches.

In another embodiment, the processor(s) and memory send an alert message via wireless signals while the aerial platform is airborne when the site contamination is present.

In another embodiment, the processor(s) and memory send an alert message via wireless signals while the aerial platform is airborne that a high vegetation contamination is present at the geographic region such that a vegetation removal service can be directed to the location of the geographic region.

Another embodiment comprises a method of performing a site inspection. The method comprises navigating an aerial platform to a location of a geographic region, and capturing a digital image of the geographic region with an imaging device onboard the aerial platform while the aerial platform is airborne. The method further comprises segmenting the digital image into superpixels at the aerial platform, selecting a region of interest from the digital image to define one or more patches associated with the superpixels, assigning terrain texture categories to the patches, and assigning the terrain texture categories to the superpixels based on the terrain texture categories of the patches to generate a texture classified representation of the digital image. The method further comprises determining whether a site contamination is present at the geographic region based on the texture classified representation of the digital image, and reporting an alert upon determining that the site contamination is present.

In another embodiment, determining whether a site contamination is present comprises designating one or more of the terrain texture categories as a site contamination category, identifying a percentage of the superpixels in the texture classified representation that are assigned the site contamination category, and determining that the site contamination is present at the geographic region when the percentage exceeds a threshold.

In another embodiment, determining whether a site contamination is present comprises designating one or more of the terrain texture categories as a site contamination category, identifying a total number of the superpixels in the texture classified representation that are assigned the site contamination category, and determining that the site contamination is present at the geographic region when the total number exceeds a threshold.

In another embodiment, assigning the terrain texture categories to the superpixels comprises: for each individual superpixel of the superpixels, identifying pixels in the individual superpixel that belong to at least one of the patches, identifying one or more of the terrain texture categories assigned to each of the pixels, and assigning one of the terrain texture categories that is assigned to a majority of the pixels as a terrain texture category for the individual superpixel.

In another embodiment, assigning the terrain texture categories to the patches comprises assigning the terrain texture categories to the patches based on a patch classification model. The method further comprises presenting one or more test images to a user, receiving input from the user indicating areas in the test images as test patches, receiving input from the user assigning one of the terrain texture categories to the test patches, and training the patch classification model based on the test patches.

In another embodiment, the site contamination comprises vegetation encroachment, and the terrain texture categories include at least a high vegetation category and a vegetation-free category. The step of receiving input from the user comprises receiving input from the user indicating first areas of concentrated vegetation within the test images as first test patches, receiving input from the user assigning the high vegetation category to the first test patches, receiving input from the user indicating second areas of non-vegetation within the test images as second test patches, and receiving input from the user assigning the vegetation-free category to the second test patches.

In another embodiment, the site contamination comprises erosion, and the terrain texture categories include at least a high erosion category and an erosion-free category. The step of receiving input from the user comprises receiving input from the user indicating first areas of concentrated erosion within the test images as first test patches, receiving input from the user assigning the high erosion category to the first test patches, receiving input from the user indicating second areas of non-erosion within the test images as second test patches, and receiving input from the user assigning the erosion-free category to the second test patches.

In another embodiment, reporting an alert upon determining that the site contamination is present comprises sending an alert message via wireless signals while the aerial platform is airborne.

In another embodiment, reporting an alert upon determining that the site contamination is present comprises sending an alert message via wireless signals while the aerial platform is airborne that a high vegetation contamination is present at the geographic region such that a vegetation removal service can be directed to the location of the geographic region.

Another embodiment comprises an unmanned aerial inspection system. The unmanned aerial inspection system includes a UAV, an imaging device on the UAV, and a platform controller on the UAV comprising processor(s) and memory that: navigate the UAV to a location of a geographic region, capture a digital image of the geographic region with the imaging device while the UAV is airborne, and process the digital image while the UAV is airborne to: segment the digital image into superpixels, select a region of interest from the digital image to define one or more patches associated with the superpixels, assign terrain texture categories to the patches, assign the terrain texture categories to the superpixels based on the terrain texture categories of the patches to generate a texture classified representation of the digital image, determine whether a vegetation encroachment is present at the geographic region based on the texture classified representation of the digital image, and send an alert message via wireless signals to report when the vegetation encroachment is present.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Embodiments disclosed herein enable aerial inspection of geographic regions or sites on the ground. For example, the oil and gas industry is a highly-regulated industry, and the conditions of their facilities may need to be maintained up to a certain standard. The embodiments disclosed herein may therefore be used to aerially inspect well sites or other geographic regions to detect vegetation growth, erosion, ground contamination, and/or types of site contamination.

Figure 1:
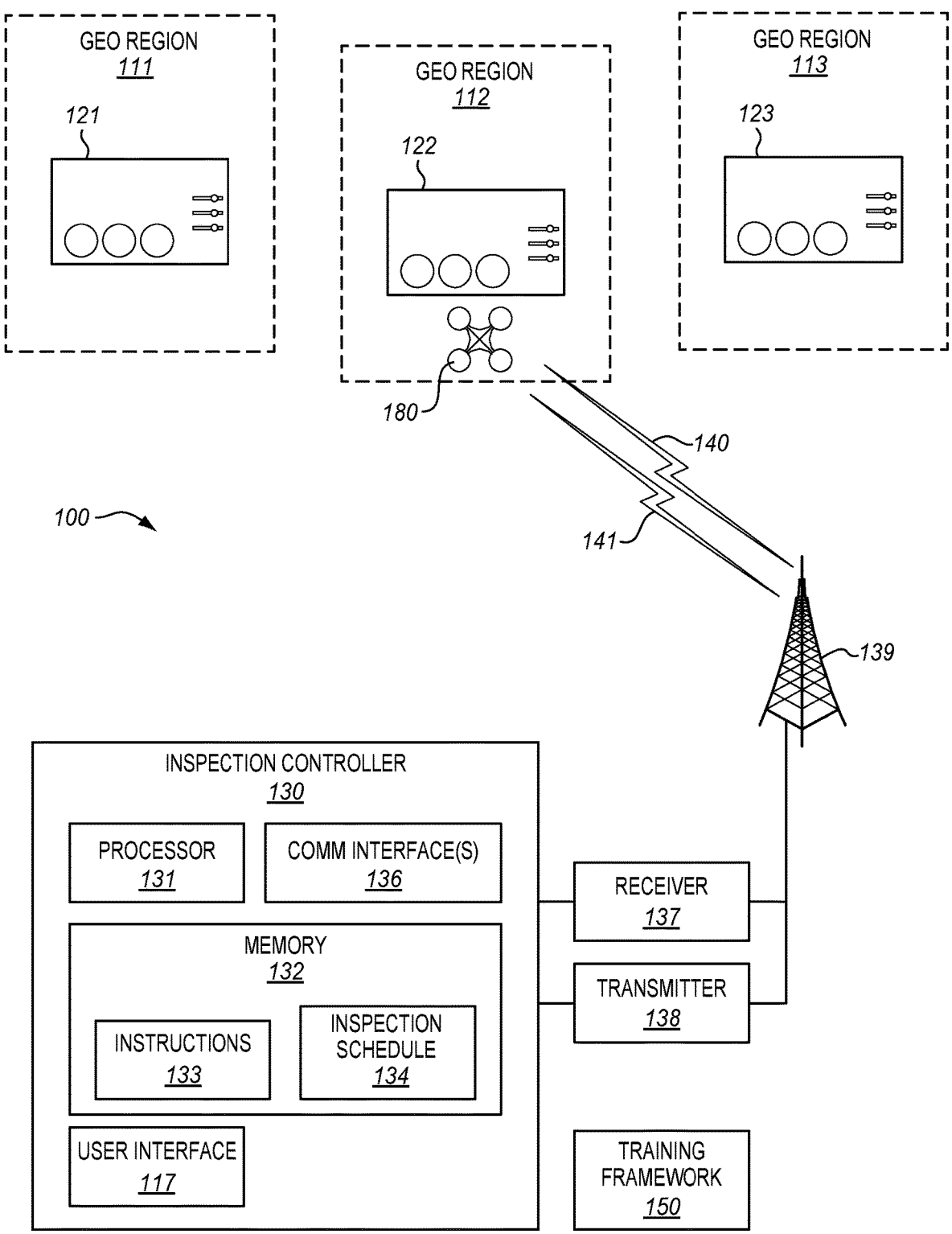
FIG. 1 is a block diagram of an unmanned aerial inspection system in an illustrative embodiment.

FIG. 1 is a block diagram of an unmanned aerial inspection system 100 in an illustrative embodiment. Unmanned aerial inspection system 100 is configured to perform aerial inspection of one or more geographic regions 111-113, such as to detect site contamination at geographic regions 111-113. A geographic region 111-113 is an area that is visible from the sky, and is also referred to as a "site". A variety of facilities may be installed at geographic regions 111-113. In this embodiment, a well site 121-123 is at geographic regions 111-113, respectively. Site contamination refers to the introduction or formation of an undesirable element or condition at a site. For example, a site contamination may comprise overgrowth or encroachment of vegetation, erosion of soil, material spill resulting in soil contamination, etc., at one or more of geographic regions 111-113. While FIG. 1 shows three geographic regions 111-113, unmanned aerial inspection system 100 may be used to monitor a single geographic region or more than three geographic regions in other embodiments.

Unmanned aerial inspection system 100 includes one or more aerial platforms, such as aerial platform 180. Each aerial platform 180 comprises an aircraft (e.g., an Unmanned Aerial Vehicle (UAV)) that is configured to fly over one or more of geographic regions 111-113 and collect data. For example, while FIG. 1 shows aerial platform 180 over geographic region 112 during a particular data collection period, aerial platform 180 may gather data in another geographic region 111/113 during a different data collection period. Aerial platform 180 includes sensors configured to gather data related to a geographic region 111-113. As will be described in more detail below, aerial platform 180 includes an imaging device configured to capture one or more digital images representing a particular field of view of a geographic region 111-113. Aerial platform 180 includes onboard functionalities that process a digital image, and assign terrain texture categories to areas of the digital image. Aerial platform 180 also includes onboard functionalities that are able to detect a site contamination based on the terrain texture categories.

Unmanned aerial inspection system 100 also includes an inspection controller 130. Inspection controller 130 includes a hardware platform comprised of a processor 131, a memory 132, and one or more communication interfaces 136. The processor 131 comprises an integrated hardware circuit configured to execute instructions, and may also include a Central Processing Unit (CPU) or Graphics Processing Unit (GPU). The memory 132 is a non-transitory computer readable storage medium that stores instructions 133 that are executable by processor 131 to cause inspection controller 130 to perform the various operations described herein. Memory 132 may also store an inspection schedule 134, which indicates times and locations for inspection of geographic regions 111-113, and other data, applications, etc.

Inspection controller 130 may further include a user interface 117 that is coupled to processor 131. User interface 117 is a hardware component for interacting with an end user. For example, user interface 117 may include a screen or touch screen (e.g., a Liquid Crystal Display (LCD), a Light Emitting Diode (LED) display, etc.), a keyboard or keypad, a tracking device (e.g., a trackball or trackpad), a speaker, and a microphone.

Inspection controller 130 is communicatively coupled to a receiver 137 and a transmitter 138, which in turn are coupled to an antenna 139. Inspection controller 130 is configured to exchange wireless communications (e.g., Radio-Frequency (RF) transmissions) with aerial platform 180 via receiver 137 and transmitter 138. In this example, inspection controller 130 causes transmitter 138 to transmit control signals 140 to aerial platform 180. The control signals 140 may be broadcast signals (e.g., not addressed to a particular aerial platform 180), or may be unicast or multicast signals that are addressed to a particular aerial platform(s). Inspection controller 130 may also receive reporting data 141 from aerial platform 180 through receiver 137.

Unmanned aerial inspection system 100 further includes a training framework 150. Training framework 150 may be implemented on the same hardware platform as inspection controller 130. Additionally or alternatively, training framework 150 may be implemented on aerial platform 180.

Training framework 150 is configured to train classifiers on aerial platform(s) 180. As will be described in more detail below, training framework 150 interacts with a user to define training data based on one or more test images. Training framework 150 uses the training data to train a supervised learning model used on aerial platform(s) 180.

During operation, inspection controller 130 determines when to initiate inspection of one or more geographic regions 111-113 based on inspection schedule 134. In some embodiments, the inspection schedule 134 indicates when to initiate an inspection period based on time, such as a time elapsed since a previous inspection, current date or current time, or a combination thereof. Additionally or alternatively, the inspection schedule 134 may indicate when to initiate an inspection period based on information received from aerial platform 180. For example, the inspection schedule 134 may indicate that an inspection period is to be initiated responsive to an indication that aerial platform 180 is ready to perform an inspection (e.g., is at a particular location and has a particular field of view). Additionally or alternatively, the inspection schedule 134 may be based on conditions that change over time. For example, inspection controller 130 may schedule an inspection period when ambient conditions are similar to ambient conditions during a previous inspection period, during training of aerial platform 180, etc.

Figure 2:
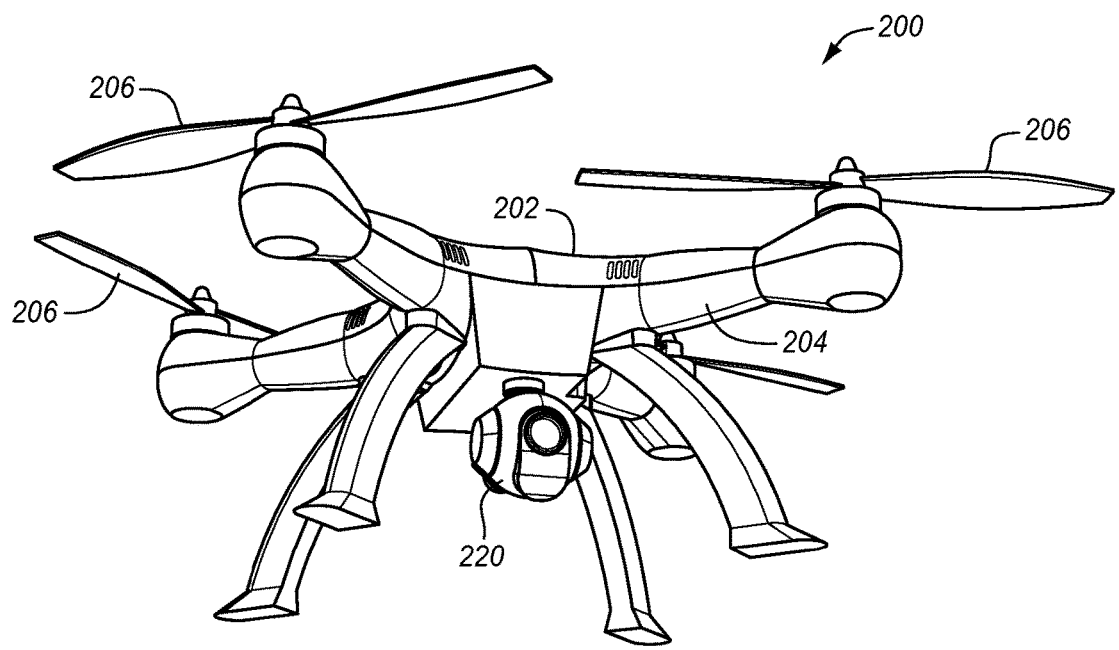
FIGS. 2-3 are perspective views of aerial platforms in illustrative embodiments.
Figure 3:
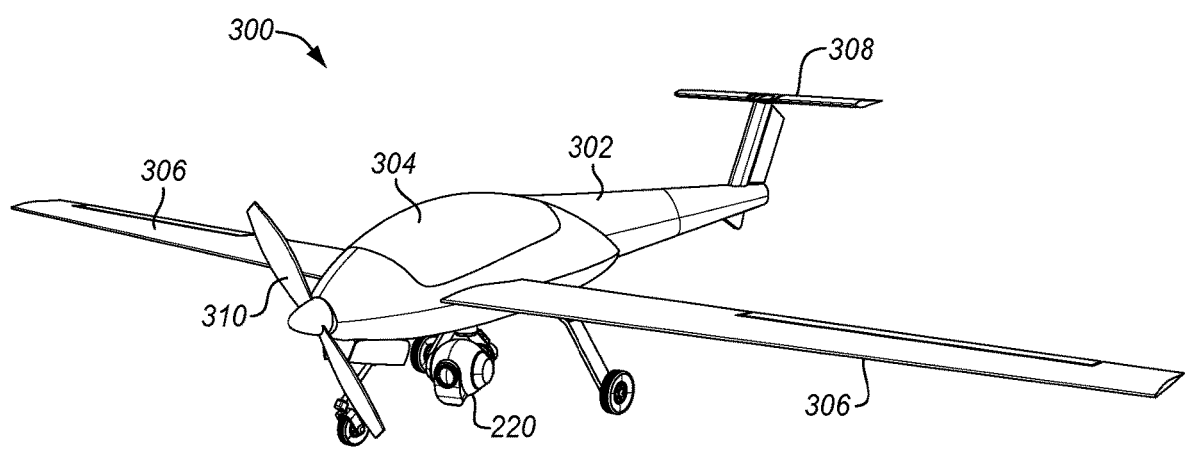

FIGS. 2-3 are perspective views of aerial platforms in illustrative embodiments. Aerial platform 200 in FIG. 2 is one example of aerial platform 180 in FIG. 1. Aerial platform 200 comprises a rotary-wing UAV 202 that is autonomous (i.e., self-piloted) or is piloted remotely. Rotary-wing UAV 202 includes a fuselage 204, and a plurality of rotors 206 configured to provide lift and thrust. With this design, rotary-wing UAV 202 is able to take off and land vertically, hover, fly forwards, backwards, and laterally. Rotary-wing UAV 202 also includes an imaging device 220 configured to capture digital images. Imaging device 220 is illustrated as being mounted on the bottom side of fuselage 204, but may be mounted at other locations to allow a clear field of view to geographic regions 111-113. Although rotary-wing UAV 202 is shown as a quadcopter in FIG. 2 with four rotors, rotary-wing UAV 202 may have more or less rotors in other embodiments.

Aerial platform 300 in FIG. 3 is another example of aerial platform 180 in FIG. 1. Aerial platform 300 comprises a fixed-wing UAV 302 that is autonomous or is piloted remotely. Fixed-wing UAV 302 includes a fuselage 304, wings 306, a tail section 308, and a propeller 310 (or another type of engine that produces thrust, such as a jet engine). Fixed-wing UAV 302 also includes an imaging device 220 configured to capture digital images. Imaging device 220 is illustrated as being mounted on the bottom side of fuselage 304, but may be mounted at other locations to allow a clear field of view to geographic regions 111-113. The structure of fixed-wing UAV 302 is provided as an example, and may have other designs/configurations in other embodiments.

Figure 4:
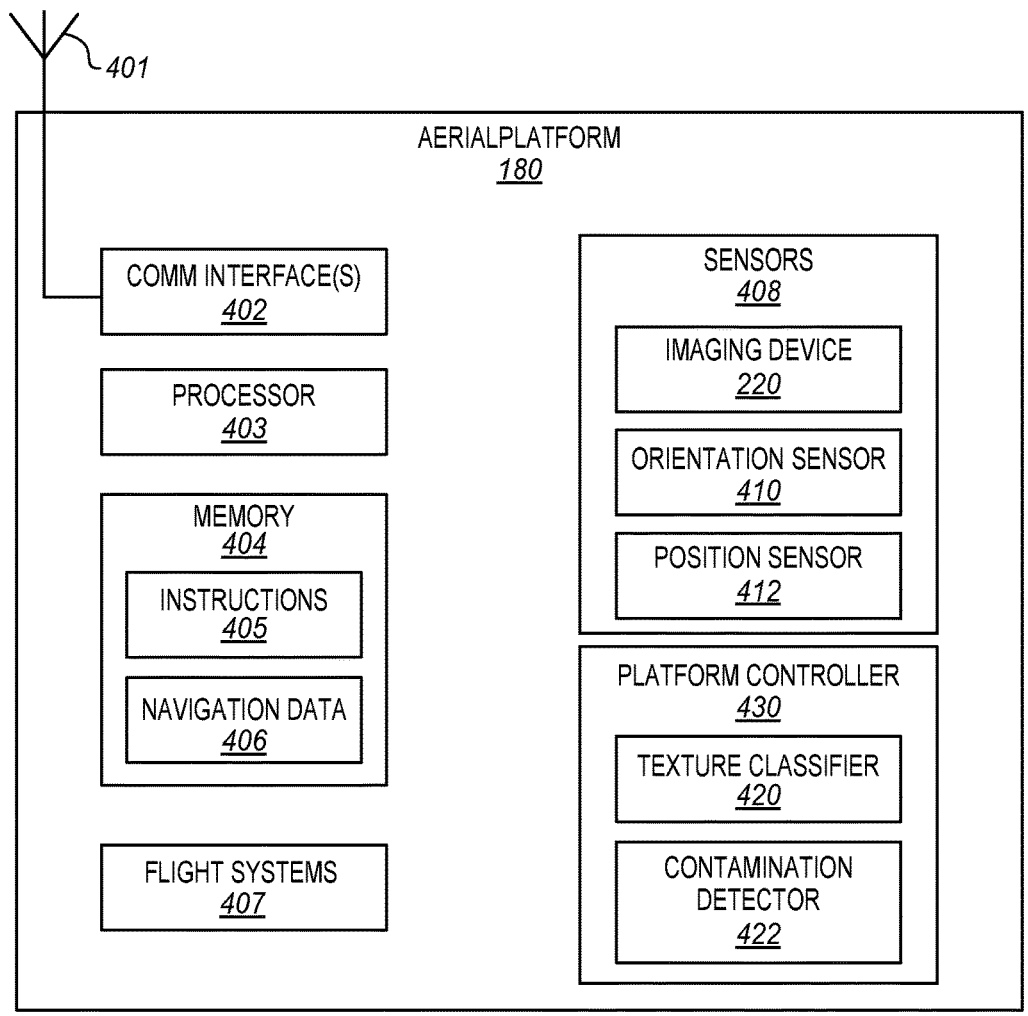
FIG. 4 is a block diagram of an aerial platform in an illustrative embodiment.

FIG. 4 is a block diagram of aerial platform 180 in an illustrative embodiment. In the example illustrated in FIG. 4, aerial platform 180 includes a hardware platform comprised of a processor 403, a memory 404, a plurality of sensors 408, and one or more communication interfaces 402, and also includes flight systems 407. Communication interfaces 402 include a wireless communication interface (e.g., including a transmitter and a receiver) coupled to an antenna 401. Communication interfaces 402 may also include a wired communication interface, such as a data port (e.g., a Universal Serial Bus (USB) port, an Ethernet port, etc.). Processor 403 is configured to execute instructions 405 stored in memory 404 to implement a platform controller 430. Platform controller 430 is configured to control the operations of aerial platform 180 in performing an aerial inspection. In some embodiments, platform controller 430 is also configured to perform one or more operations responsive to control signals 140 received via communication interfaces 402 (see FIG. 1). For example, the control signals 140 may include flight control commands (e.g., remote piloting input) from inspection controller 130 or navigational commands (e.g., waypoints or other navigation data 406) to direct aerial platform 180 to a geographic region 111-113. In this example, platform controller 430 controls the flight systems 407 to move aerial platform 180 to a particular location. As another example, the control signals 140 may direct that particular ones of the sensors 408 be used to gather data. For example, the control signals 140 may direct that, at a particular position, an imaging device 220 captures one or more digital images.

Instructions 405 are executable by processor 403 to control various subsystems of aerial platform 180. For example, instructions 405 may include one or more communication protocol stacks to enable processor 403 to send and receive information via the communication interfaces 402. Instructions 405 may also include flight instructions that are executable by processor 403 to control flight systems 407 to navigate aerial platform 180, to stabilize aerial platform 180, etc. In some implementations, one or more of the sensors 408 provide data to processor 403 for use in controlling flight of aerial platform 180. To illustrate, sensors 408 may include a position sensor 412 and an orientation sensor 410. In this example, position sensor 412 may include a Global Positioning System (GPS) receiver, a local positioning system receiver, a dead reckoning system, etc., that generates position data. The position data may be transmitted to inspection controller 130 and/or to processor 403 to determine a flight path for aerial platform 180. Orientation sensor 410 may generate orientation data (e.g., a pitch, roll, and/or yaw of aerial platform 180 during flight) as flight control feedback, facilitate determination of a field of view of imaging device 220, etc. The orientation data may be transmitted to inspection controller 130 and/or to processor 403.

Flight systems 407 include components to generate thrust and lift, and components to enable flight path control. The specific components of flight systems 407 may be different in different implementations. For example, if aerial platform 180 is a rotary-wing UAV (see FIG. 2), then flight systems 407 include a plurality of rotors that provide lift, thrust, and flight path control. If aerial platform 180 is a fixed-wing UAV (see FIG. 3), then flight systems 407 include one or more propellers, fans, or jets to provide thrust, wings to provide lift, and flight surfaces or wing deformation actuators to provide flight path control.

In FIG. 4, sensors 408 include imaging device 220, orientation sensor 410, and position sensor 412. In other embodiments, sensors 408 may include more sensors, fewer sensors, or different sensors. Imaging device 220 includes an image sensor configured to capture digital images. In one embodiment, imaging device 220 comprises a digital camera (e.g., High-Definition (HD)) that captures light across three wavelength bands in the visible spectrum; red, green, and blue (RGB). The digital camera may use charge coupled device (CCD) or complementary metal oxide semiconductor (CMOS) sensors to capture a digital image. Although FIG. 4 illustrates a single imaging device 220, aerial platform 180 may include multiple imaging devices 220 in other embodiments.

Orientation sensor 410 includes sensors to determine an orientation of aerial platform 180 in space, such as a pitch angle, a yaw angle, and a roll angle. For example, orientation sensor 410 may include a plurality of gyroscopic sensors. Orientation sensor 410 generates the orientation data, which may be used to determine a field of view of imaging device 220 to ensure that the digital image corresponds to a target field of view.

Figure 5:
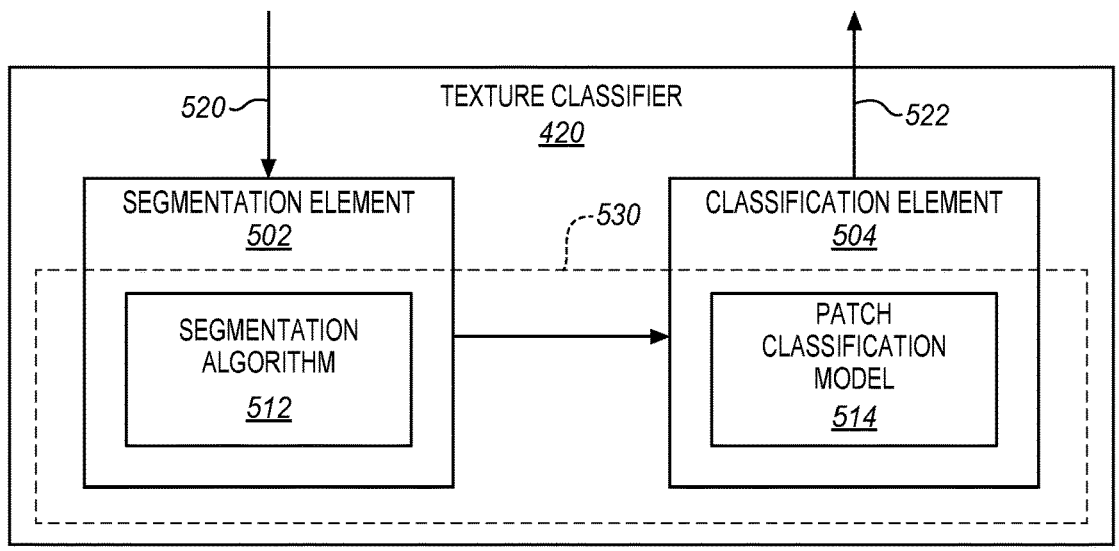
FIG. 5 is a block diagram of a texture classifier in an illustrative embodiment.

In one embodiment, platform controller 430 includes a texture classifier 420 and a contamination detector 422. Texture classifier 420 is a subsystem of aerial platform 180 configured to perform texture classification of a digital image acquired by imaging device 220 by assigning terrain texture categories to the digital image. FIG. 5 is a block diagram of texture classifier 420 in an illustrative embodiment. In this embodiment, texture classifier 420 is represented by a segmentation element 502 and a classification element 504. Segmentation element 502 comprises circuitry, logic, hardware, means, etc., configured to acquire a digital image 520, and perform image segmentation by partitioning the digital image 520 into multiple segments or superpixels (or superpixel cells comprising groups of similar spatially connected pixels). A superpixel is a grouping of pixels in an area of a digital image that have similar or homogeneous visual properties, such as color, intensity, etc. Thus, a grouping of pixels in an area of a digital image may be treated as a single unit, which is referred to as a superpixel. In one embodiment, a machine learning architecture may be used to implement segmentation element 502. Machine learning generally refers to an automated process of parsing data, learning from the data, and then adapting the output based on the learning without being explicitly programmed. Machine learning differs from traditional computer processes where instructions or programming is predefined and explicit so that the same steps are repeated given the same input. Rather than having activities defined in advance, a system implementing machine learning may be trained to observe patterns in data and adjust actions or steps to take over time. According to the type of input training data, machine learning algorithms may generally be grouped into three categories: supervised learning, unsupervised learning, and semi-supervised learning. In supervised learning, the available training data is labelled, whereas unsupervised learning algorithms are trained on un-labelled training data. In semi-supervised learning, the input contains both labeled and un-labelled training data. In this embodiment, an unsupervised segmentation algorithm 512 may be used for segmentation element 502. For example, a linear iterative clustering algorithm, such as Simple Linear Iterative Clustering (SLIC), may be used to partition a digital image into superpixels. Other methods, such as graph based algorithms "Normalized Cut" and "Random Walks", produce similar superpixel segmentation. Segmentation element 502 is not restricted to any particular superpixel implementation, which may be selected and customized to the type of the target texture categories.

Classification element 504 comprises circuitry, logic, hardware, means, etc., configured to perform patch classification by identifying patches in the superpixels of a digital image, and assigning a terrain texture category to each of the patches. A patch is a collection of neighboring pixels of a fixed size. For example, a patch may be a collection of 16×16 pixels, 20×20 pixels, 100×100 pixels, 1000×1000 pixels, etc. In one embodiment, a machine learning architecture may be used to implement classification element 504. Patch classification generally involves two phases: the learning phase and the recognition phase. In the learning phase, a supervised machine learning algorithm may be used to build a patch classification model 514 based on test patches. The texture content of the test patches may be characterized by textural properties, such as spatial structure, contrast, roughness, orientation, etc. In the recognition phase, the texture content of patches in a digital image are compared to the test patches via the patch classification model 514, and the patches are assigned to a terrain texture category based on where they fit in the patch classification model 514. In one embodiment, classification element 504 may include a machine learning model for multiclass object classification, such as Support-Vector Machine (SVM), Multi-Layer Perceptron (MLP), and other similar models, configured to assign the terrain texture categories to the patches using the patch classification model 514. Based on terrain texture categories of the patch(es) in the superpixels, classification element 504 is able to assign a terrain texture category to each superpixel of the digital image. The result is that classification element 504 outputs a texture classified representation 522 of the digital image 520, where texture classified representation 522 indicates the superpixels and the terrain texture category for the superpixels.

In the embodiment of FIG. 5, texture classifier 420 applies a voting schema to combine multiple machine learning models to generate texture classified representation 522. More particularly, texture classifier 420 uses one model (e.g., unsupervised segmentation algorithm 512) to segment the digital image 520 into superpixels. Texture classifier 420 uses another model (e.g., patch classification model 514) to classify patches in the superpixels, and to classify the superpixels based on the patch classifications. The voting schema combining multiple machine learning models indicate that texture classifier 420 implements an ensemble learning architecture 530.

In FIG. 4, contamination detector 422 is a subsystem of aerial platform 180 configured to determine whether a site contamination is identified at a geographic region 111-113 based on the texture classified representation 522 of the digital image 520. Contamination detector 422 may trigger an action when a site contamination is identified. For example, contamination detector 422 may report an alert that is sent to a service entity via wired or wireless signals so that the site contamination may be addressed.

In some embodiments, aerial platform 180 may also include a training framework 150 and/or a user interface 117 as described above in FIG. 1.

Figure 6:
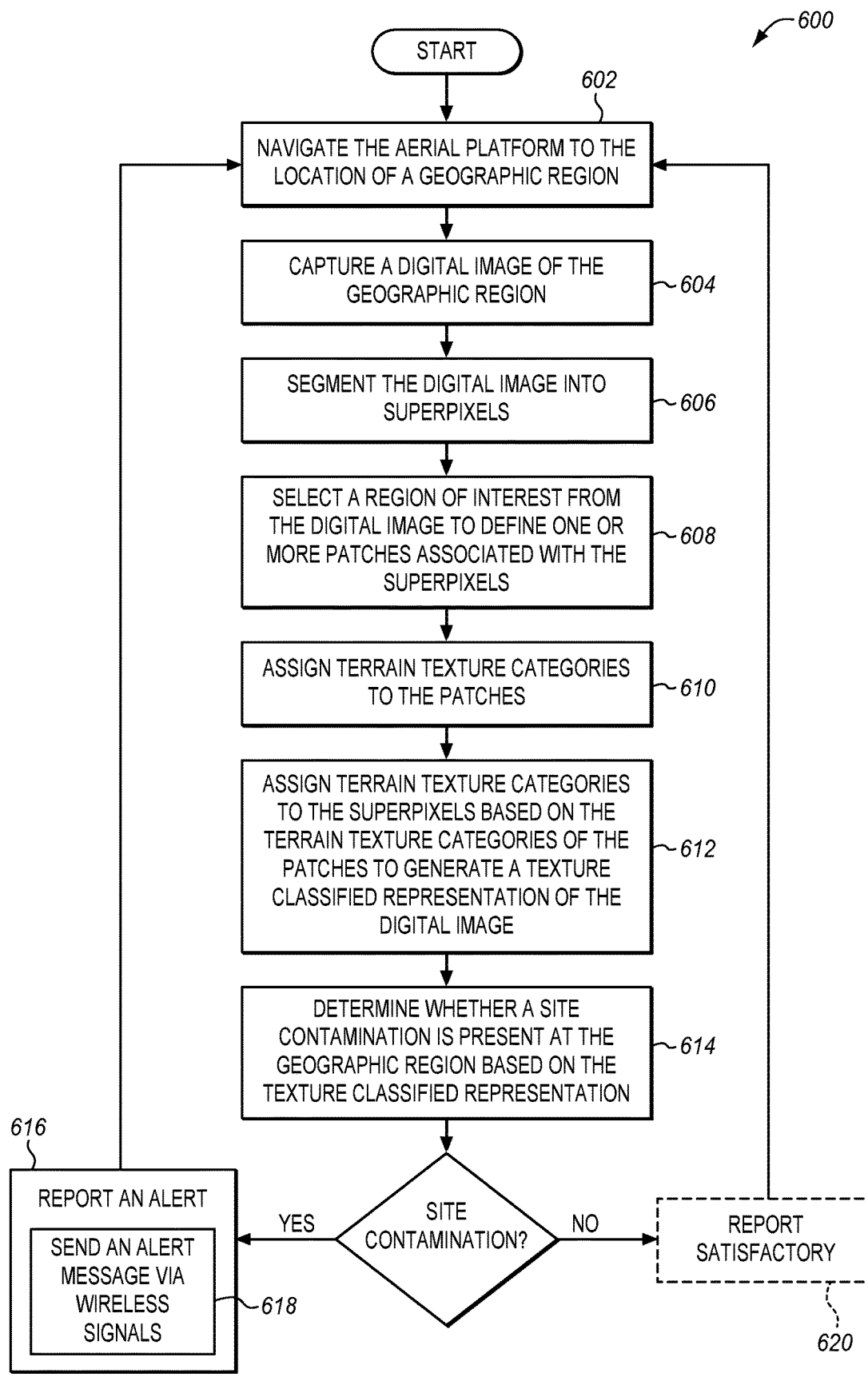
FIG. 6 is a flow chart illustrating a method of performing a site inspection in an illustrative embodiment.

FIG. 6 is a flow chart illustrating a method 600 of performing a site inspection in an illustrative embodiment. The steps of method 600 will be described with respect to unmanned aerial inspection system 100 of FIGS. 1-5, although one skilled in the art will understand that the methods described herein may be performed on other types of systems. The steps of the methods described herein are not all inclusive and may include other steps not shown. The steps for the flow charts shown herein may also be performed in an alternative order.

A site inspection may be part of a service used to inspect one or more geographic regions 111-113 or sites. For example, an oil and gas company may use the site inspection service to monitor wells sites or the like for site contaminations. For a site inspection, platform controller 430 navigates aerial platform 180 to the location of a geographic region 111-113 (step 602). When at the location of the geographic region 111-113, imaging device 220 captures a digital image 520 of the geographic region 111-113 (step 604). For example, platform controller 430 may instruct imaging device 220 to capture the digital image 520 while aerial platform 180 is airborne and when aerial platform 180 is positioned at a desired location (e.g., latitude, longitude, altitude, etc.) above the geographic region 111-113 with a clear line of site to the geographic region 111-113. Platform controller 430 may process data from orientation sensor 410 and/or position sensor 412 to position aerial platform 180. Platform controller 430 may instruct imaging device 220 to capture multiple digital images as desired.

Figure 7:
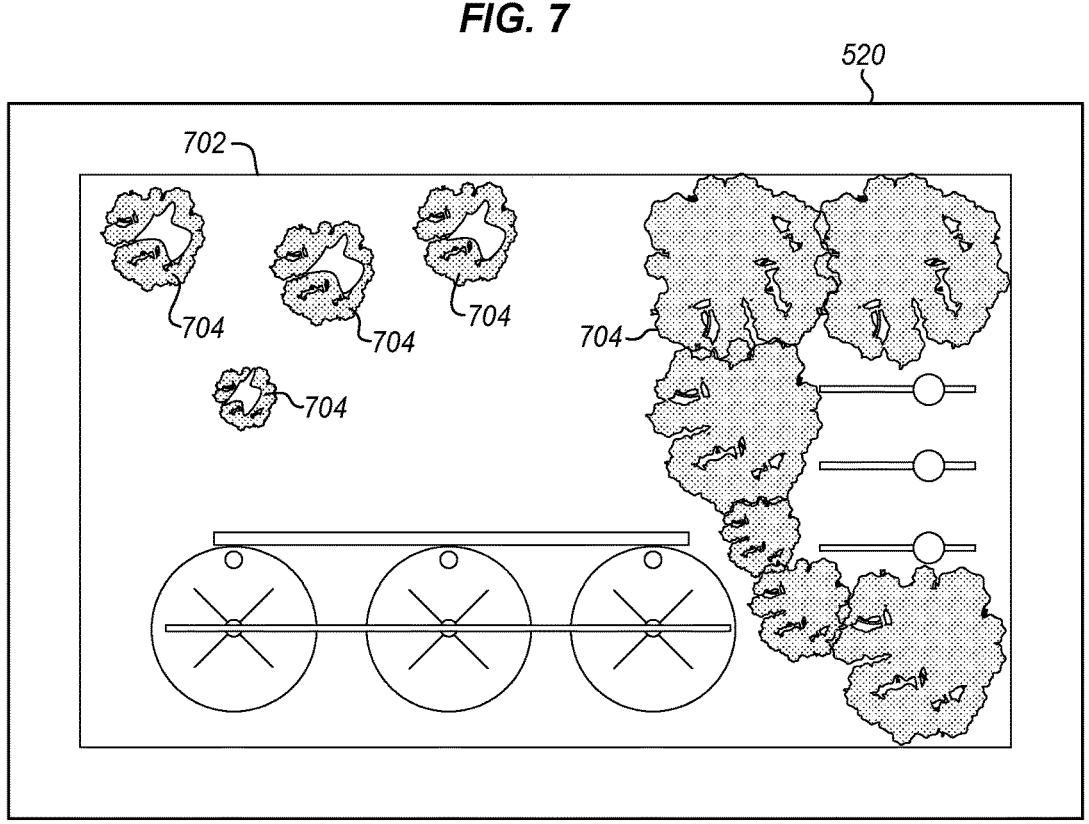
FIG. 7 illustrates a digital image captured by an imaging device in an illustrative embodiment.

FIG. 7 illustrates a digital image 520 captured by imaging device 220 in an illustrative embodiment. Digital image 520 shows a well site 702 at the geographic region 111-113 in this example, although the geographic region 111-113 may include other types of equipment, buildings, construction, etc. Digital image 520 also shows potential contaminants 704 at well site 702, which may comprise vegetation, erosion, soil contamination, etc.

Figure 8:
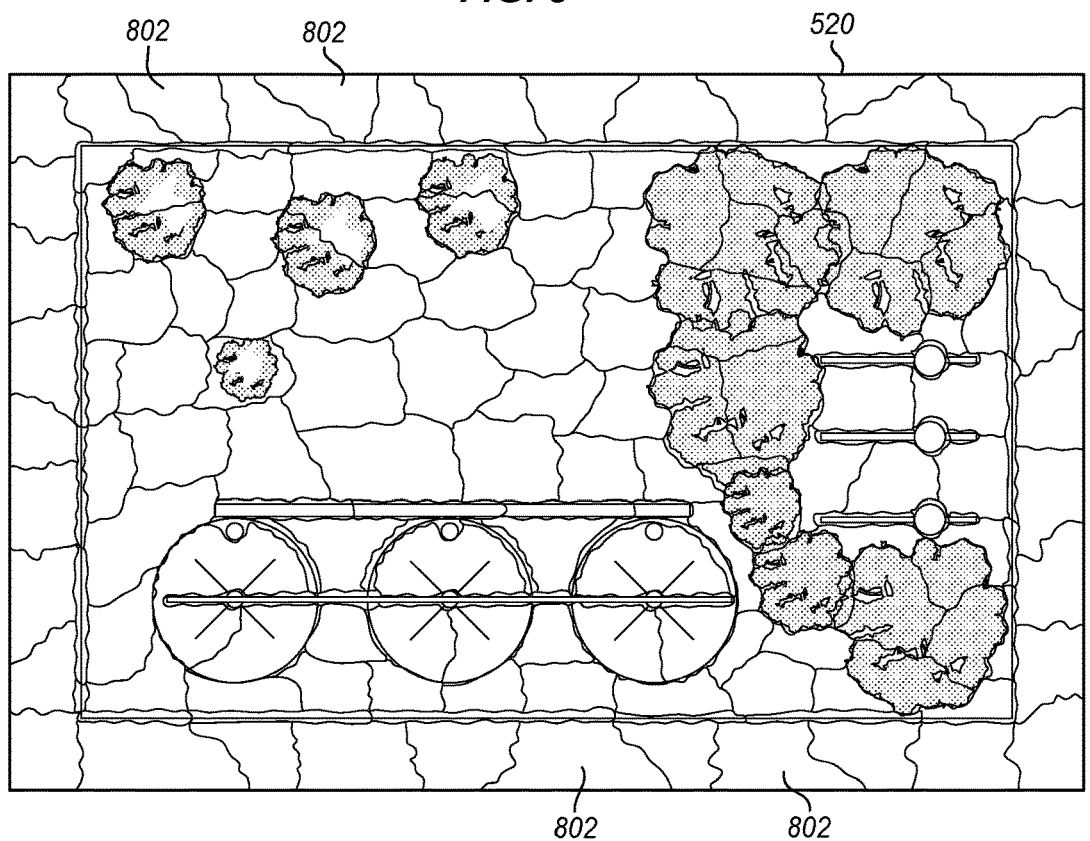
FIG. 8 illustrates a digital image partitioned into superpixels in an illustrative embodiment.

The digital image 520 is then processed, which may occur while aerial platform 180 is airborne. Processing of digital image 520 in this embodiment involves multiple image analysis techniques, which are image segmentation and patch classification. For image segmentation, segmentation element 502 (see FIG. 5) segments the digital image 520 into superpixels (step 606 of FIG. 6). As described above, a superpixel is a grouping of pixels in an area of digital image 520 that have similar or homogeneous visual properties. FIG. 8 illustrates digital image 520 partitioned into superpixels 802 in an illustrative embodiment. Although not visible in FIGS. 7-8, digital image 520 is a pixel-grid. Segmentation element 502 partitions the pixel-grid into a plurality of non-overlapping superpixels 802, such as with segmentation algorithm 512.

Figure 9:
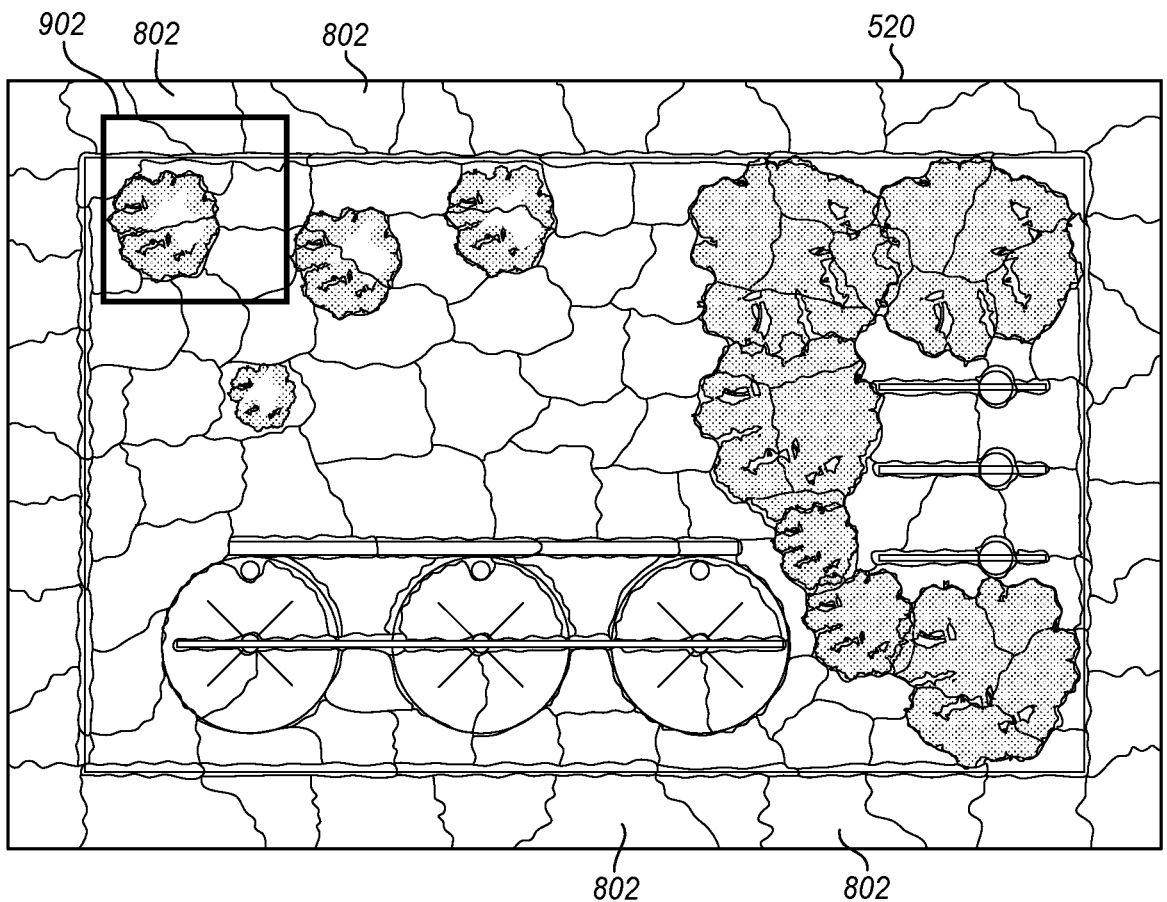
FIG. 9 illustrates a region of interest on a digital image in an illustrative embodiment.
Figure 10:
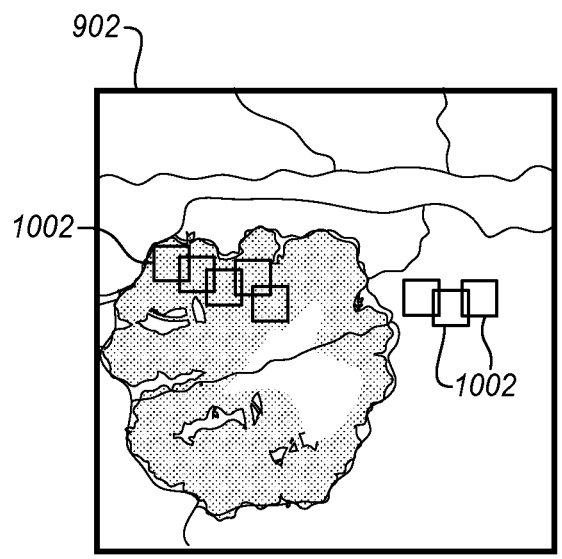
FIG. 10 is a magnified view of a region of interest in an illustrative embodiment.

For patch classification, classification element 504 selects a region of interest from digital image 520 to identify or define one or more patches associated with or in superpixels 802 (step 608 in FIG. 6), and assigns terrain texture categories to the patches (step 610), such as with patch classification model 514. FIG. 9 illustrates a region of interest 902 on digital image 520 in an illustrative embodiment. In this embodiment, region of interest 902 is a rectangular region that contains at least one superpixel 802. Classification element 504 is configured to iteratively apply or slide the region of interest 902 across digital image 520 (e.g., across the entirety of digital image 520 from top to bottom), and identify patches in superpixels 802 positioned inside of region of interest 902 at each iteration. FIG. 10 is a magnified view of region of interest 902 in an illustrative embodiment. In the iteration of region of interest 902 shown in FIG. 10, classification element 504 identifies patches 1002, which are each a collection of neighboring pixels of a fixed size generally smaller than the size of a superpixel 802. A number of patches 1002 are illustrated in FIG. 10 as an example, but more or less patches 1002 may be identified in other embodiments. Classification element 504 also assigns terrain texture categories to patches 1002. As described in more detail below, patch classification model 514 may be trained with test patches. Using patch classification model 514, classification element 504 is able to compare each patch 1002 to the texture content of the test patches to assign a terrain texture category to each of the patches 1002. It is noted herein that steps 608 and 610 may be combined in a single processing step in some embodiments.

Figure 11:
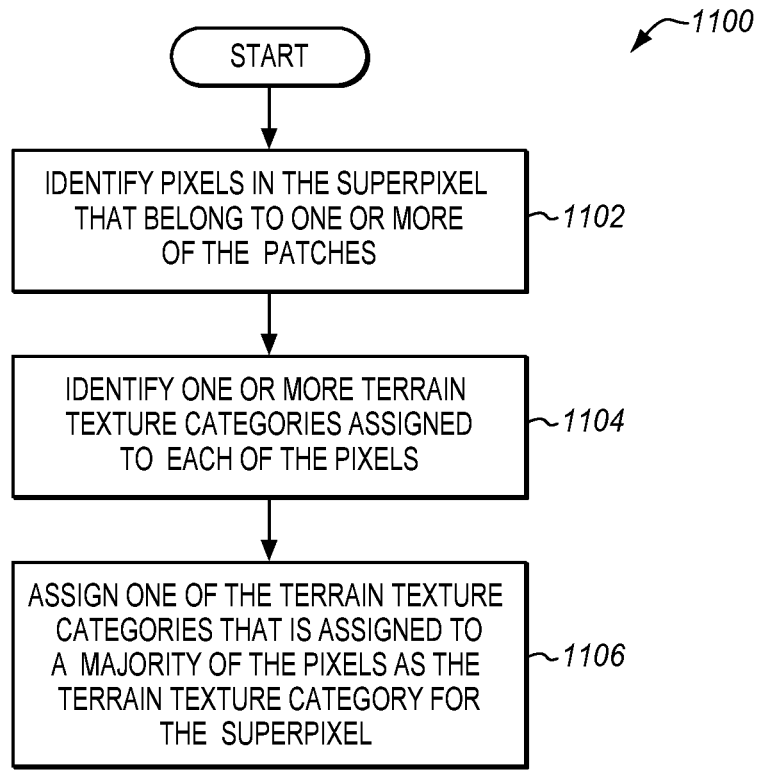
FIG. 11 is a flow chart illustrating a method of assigning texture categories to superpixels in an illustrative embodiment.
Figure 12:
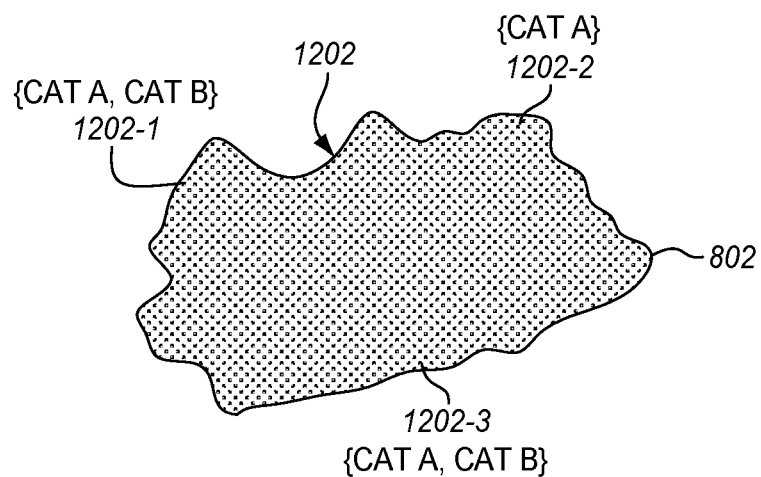
FIG. 12 illustrates pixels within a superpixel in an illustrative embodiment.

With a terrain texture category assigned to patches 1002, classification element 504 assigns terrain texture categories to superpixels 802 based on the terrain texture categories of patches 1002 located within each of the superpixels 802 (step 612 of FIG. 6). One example of assigning texture categories to superpixels 802 is illustrated in method 1100 of FIG. 11. Method 1100 of FIG. 11 may be performed for each individual superpixel 802 of digital image 520. Classification element 504 identifies pixels in the superpixel 802 that belong to one or more of the patches 1002 (step 1102). FIG. 12 illustrates pixels 1202 within a superpixel 802 in an illustrative embodiment. FIG. 12 is not drawn to scale, but is provided to illustrate a basic example of a superpixel 802. Some or all of pixels 1202 may have been identified as part of a patch 1002 within superpixel 802 as shown in FIG. 10. Also, the patches 1002 may overlap, so some or all of pixels 1202 may be part of multiple patches 1002. Classification element 504 identifies one or more terrain texture categories assigned to each of the pixels 1202 (step 1104 of FIG. 11), such as identified in step 1102. Each pixel 1202 of a patch 1002 is associated with a terrain texture category that was assigned to the patch 1002. Thus, one pixel 1202-1 in FIG. 12 is shown as having terrain texture categories A and B, another pixel 1202-2 in FIG. 12 is shown as having terrain texture category A, and yet another pixel 1202-3 in FIG. 12 is shown as having terrain texture categories A and B. Classification element 504 then assigns one of the terrain texture categories, that is assigned to a majority of the pixels 1202, as the terrain texture category for the superpixel 802 (step 1106 of FIG. 11). For example, each pixel 1202 casts one or more "votes" from the patches 1002 it belongs to and the terrain texture category or categories assigned to the patches 1002. Classification element 504 classifies a superpixel 802 with a terrain texture category according to the majority vote from the pixels 1202 in the superpixel 802.

Figure 13:
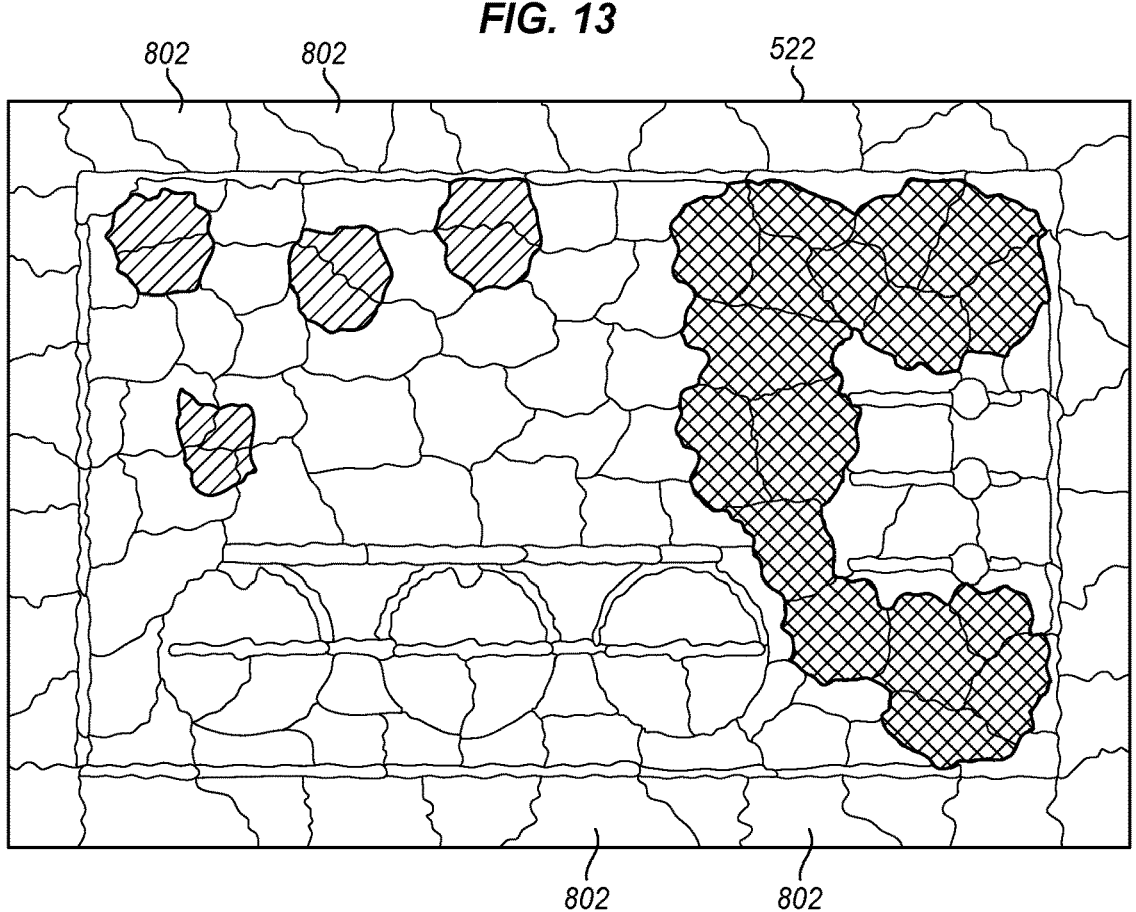
FIG. 13 illustrates a texture classified representation of a digital image in an illustrative embodiment.

Classification element 504 may perform method 1100 for each superpixel 802 to generate a texture classified representation 522 of digital image 520. FIG. 13 illustrates a texture classified representation 522 of digital image 520 in an illustrative embodiment. Each superpixel 802 in texture classified representation 522 is assigned a terrain texture category. There are three terrain texture categories represented in FIG. 13, although there may be more or less terrain texture categories in other embodiments. The superpixels 802 with cross-hashing indicate a first terrain texture category, the superpixels 802 with diagonal-hashing indicate a second terrain texture category, and the superpixels 802 shown in white or no hashing indicate a third terrain texture category. As an example, the type of site contamination under inspection may comprise vegetation encroachment at a geographic region 111-113. The terrain texture categories may include a high vegetation category, a low vegetation category, a vegetation-free category, or some combination of these or other categories. The superpixels 802 indicated by cross-hashing may represent a high vegetation category (e.g., tall grass, bushy area), the superpixels 802 indicated by diagonal-hashing may represent a low vegetation category (e.g., low grass), and the superpixels 802 indicated by no hashing may represent a vegetation-free category. In another example, the type of site contamination under inspection may comprise erosion at a geographic region 111-113. The terrain texture categories may include a high erosion category, a low erosion category, an erosion-free category, or some combination of these or other categories. The superpixels 802 indicated by cross-hashing may represent a high erosion category (e.g., cracks, severe earth subsidence), the superpixels 802 indicated by diagonal-hashing may represent a low erosion category (e.g., sand washes, small cracks), and the superpixels 802 indicated by no hashing may represent an erosion-free category.

Platform controller 430 may store texture classified representation 522 along with associated location information.

Figure 14:
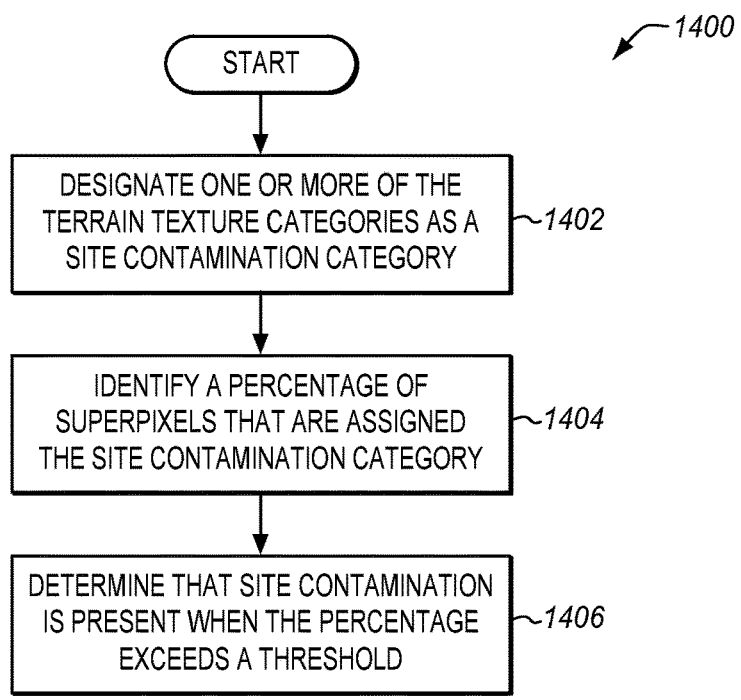
FIGS. 14-15 are flow charts illustrating methods of identifying site contamination based on a texture classified representation in an illustrative embodiment.
Figure 15:
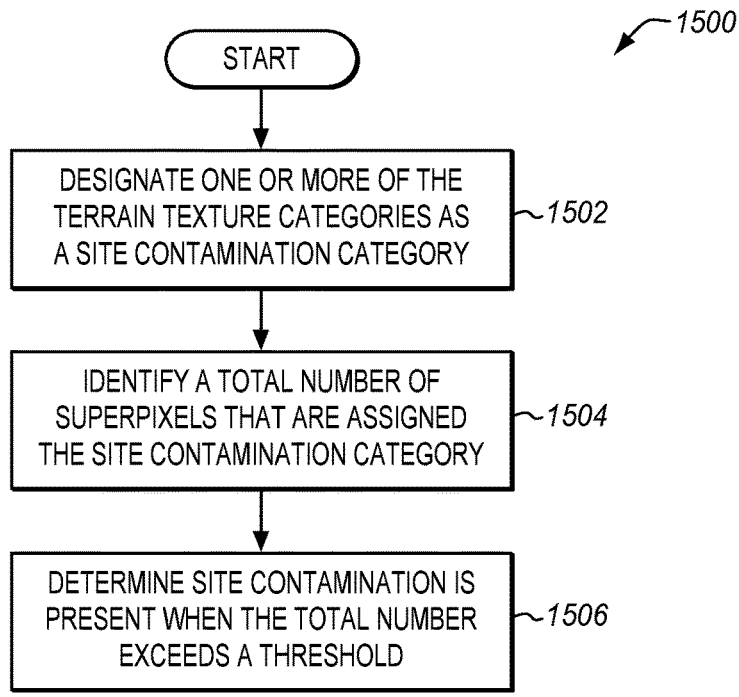

Platform controller 430 may also process texture classified representation 522 while in operation (e.g., in flight). In one embodiment, contamination detector 422 determines whether a site contamination is present at the geographic region 111-113 based on the texture classified representation 522 (step 614 of FIG. 6). FIGS. 14-15 are flow charts illustrating methods of identifying site contamination based on texture classified representation 522 in an illustrative embodiment. In method 1400 of FIG. 14, a site contamination is identified when the percentage of superpixels 802 in texture classified representation 522 having a particular terrain texture category (e.g., high vegetation, high erosion, etc.) exceeds a threshold. For the method 1400, contamination detector 422 designates one or more of the terrain texture categories as a site contamination category (step 1402). For example, a user may denote a high vegetation category, a high erosion category, etc., as a site contamination category. Contamination detector 422 identifies a percentage of superpixels 802 that are assigned the site contamination category (step 1404), and determines that the site contamination is present at the geographic region 111-113 when the percentage exceeds a threshold (step 1406).

In method 1500 of FIG. 15, a site contamination is identified when the number (e.g., one or more) of superpixels 802 in texture classified representation 522 having a particular terrain texture category exceeds a threshold. For the method 1500, contamination detector 422 designates one or more of the texture categories as a site contamination category (step 1502), identifies a total number of superpixels 802 that are assigned the site contamination category (step 1504), and determines that the site contamination is present at the geographic region 111-113 when the total number exceeds a threshold (step 1506).

In response to a determination that a site contamination is present, contamination detector 422 reports an alert (step 616 in FIG. 6). For example, contamination detector 422 may send an alert message to inspection controller 130 or another entity via wireless signals through communication interface 402 (step 618) while aerial platform 180 is airborne. The alert message may indicate that a high vegetation contamination or another type of site contamination is present at the geographic region 111-113. In another example, contamination detector 422 may enter the alert into a report, and send the report to inspection controller 130 or another entity via wireless signals, or via wired signals when aerial platform 180 has landed and data is downloaded. In response to the alert, a service entity may be deployed to the geographic region 111-113 to address the site contamination detected by aerial platform 180. For instance, a vegetation removal service may be directed to the location of the geographic region 111-113 when a high vegetation contamination is reported.

When no site contamination is detected, contamination detector 422 may report a satisfactory condition (step 620). For example, contamination detector 422 may send a notification that no contamination was identified, to inspection controller 130 or another entity via wireless signals through communication interface 402 while aerial platform 180 is airborne. In another example, contamination detector 422 may enter the satisfactory condition into a report, and send the report to inspection controller 130 or another entity via wireless signals, or via wired signals when aerial platform 180 has landed and data is downloaded.

The inspection method described above provides benefits in that data processing may be performed on-board aerial platform 180. When aerial platform 180 takes a digital image 520 of a geographic region 111-113, it is able to process the digital image 520 using the image analysis techniques of image segmentation and patch classification. Through this image analysis, aerial platform 180 is able to achieve a pixel-by-pixel classification of the digital image 520, and identify contamination at a site under inspection. The image analysis techniques are not as processing-intensive as some other techniques so processing may be performed on-board aerial platform 180. Thus, site contamination may be detected in real-time as aerial platform 180 is airborne. Another benefit is that image analysis may be performed on a digital image 520 taken with a digital camera or the like. Thus, a multispectral sensor is not needed on aerial platform 180, which lowers operational costs.

Figure 16:
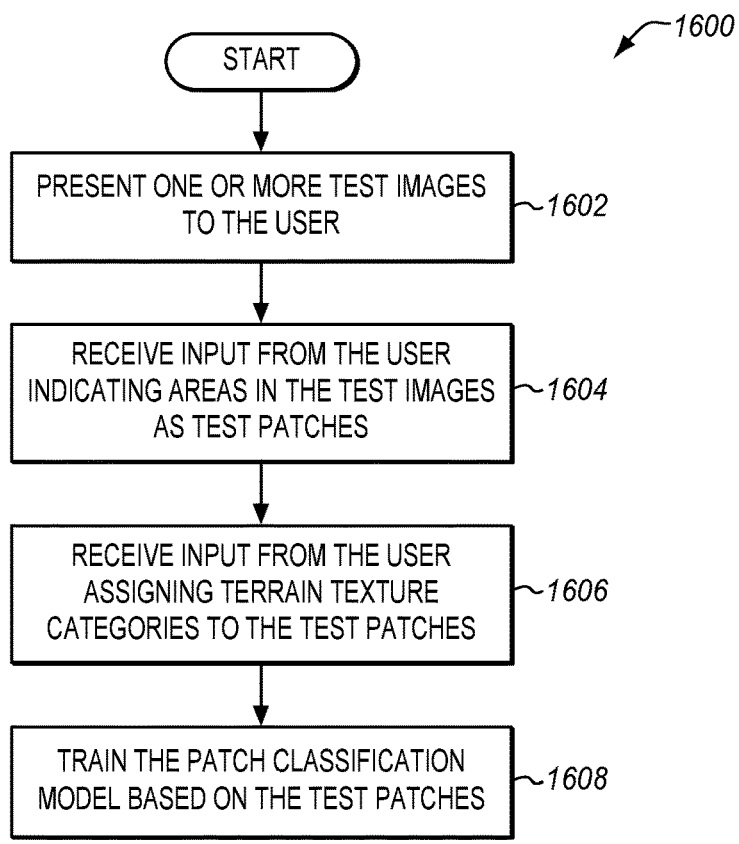
FIG. 16 is a flow chart illustrating a method of training a texture classifier in an illustrative embodiment.
Figure 17:
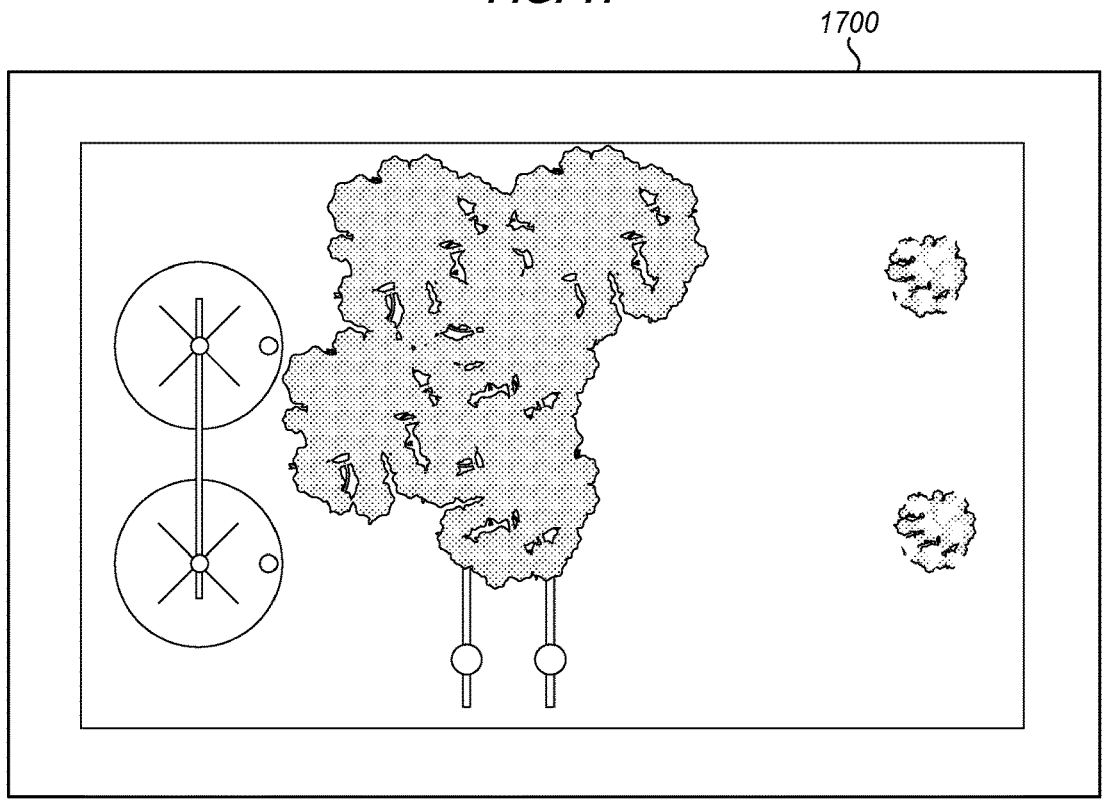
FIG. 17 illustrates a test image in an illustrative embodiment.
Figure 18:
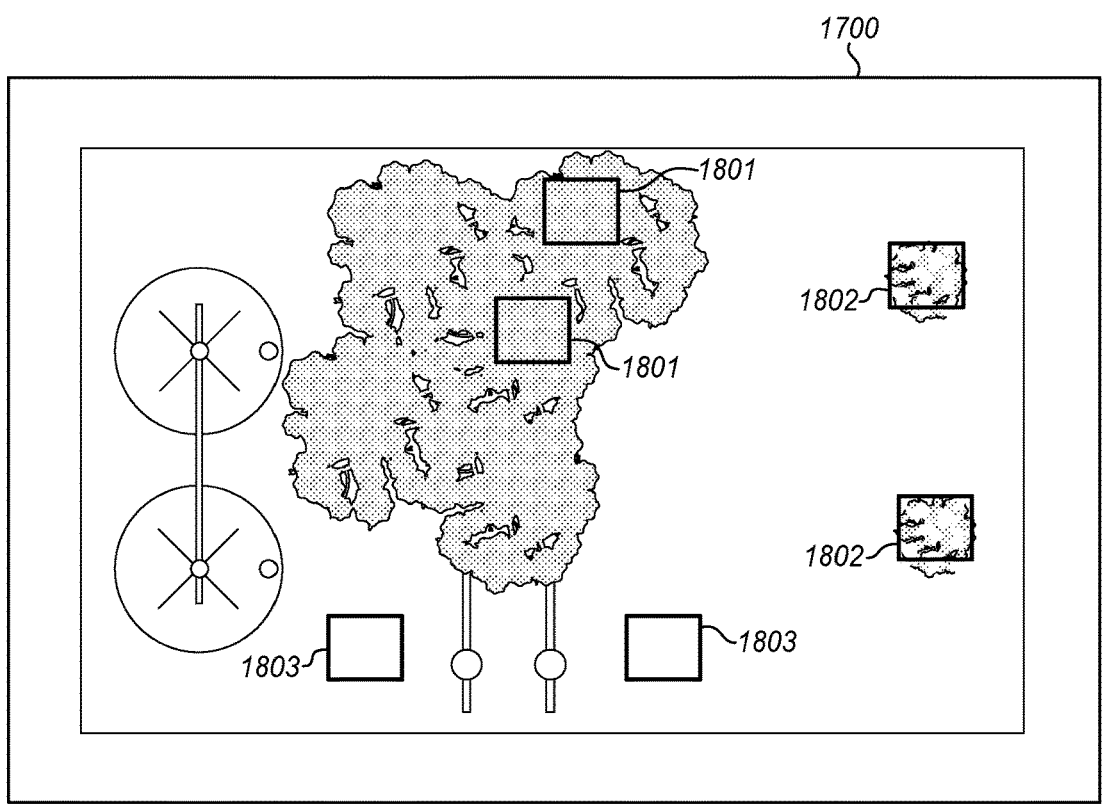
FIG. 18 illustrates input by a user on a test image in an illustrative embodiment.

Yet another benefit is that limited training data may be used to train texture classifier 420 onboard aerial platform 180. In one embodiment, texture classifier 420 may be trained with a limited number of test patches (e.g., ten, twenty, fifty, or more). FIG. 16 is a flow chart illustrating a method of training texture classifier 420 in an illustrative embodiment. As described above, a supervised machine learning method may be used to build a patch classification model 514 of classification element 504 (see FIG. 5). To train patch classification model 514, training framework 150 (see FIG. 1) may interact with a user (e.g., a human operator) to receive input. Training framework 150 presents one or more test images to the user (step 1602), such as through user interface 117. The test images may be images previously captured by aerial platform 180, or may be other images. FIG. 17 illustrates a test image 1700 in an illustrative embodiment. Test image 1700 is of another well site in this example, but may be of any site in other embodiments. Training framework 150 receives input from the user indicating areas in the test images 1700 as test patches (step 1604 in FIG. 16), such as through user interface 117. For instance, the user may draw polygons (or other shapes) on the textures of test image 1700 with a pointing device or the like that are of interest for detection. FIG. 18 illustrates input by a user on test image 1700 in an illustrative embodiment. In FIG. 18, the user has drawn polygons around areas of test image 1700 to define test patches 1801-1803. Test patches 1801-1803 may indicate different textures or terrain on test image 1700. For example, test patches 1801 may indicate concentrated vegetation, erosion, etc., test patches 1802 may indicate moderate vegetation, erosion, etc., and test patches 1803 may indicate no vegetation, no erosion, etc.

Figure 19:
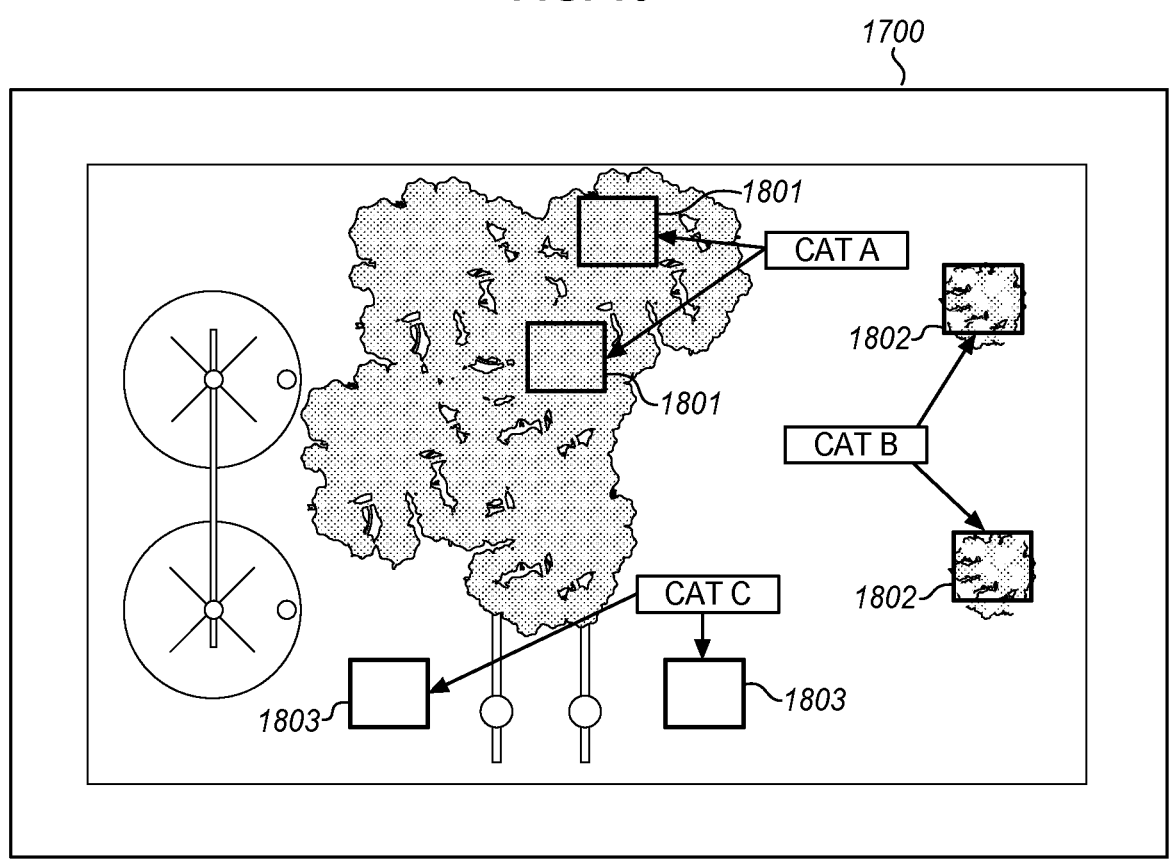
FIG. 19 illustrates further input by a user on a test image in an illustrative embodiment.

Training framework 150 further receives input from the user assigning terrain texture categories to the test patches 1801-1803 (step 1606 in FIG. 16), such as through user interface 117. Training framework 150 assigns one texture category to each of the test patches 1801-1803. FIG. 19 illustrates further input by a user on test image 1700 in an illustrative embodiment. In FIG. 19, the user has assigned a category (e.g., CAT A, CAT B, or CAT C) to test patches 1801-1803. For example, the category assigned to test patches 1801 may be high vegetation, high erosion, etc., the category assigned to test patches 1802 may be low vegetation, low erosion, etc., and the category assigned to test patches 1803 may be vegetation-free, erosion-free, etc.

Although three different types of test patches are shown in FIGS. 18-19, there may be more or less test patches and more or less terrain texture categories in other embodiments. For example, the type of site contamination may comprise vegetation encroachment, and the terrain texture categories may include a high vegetation category and a vegetation-free category. Training framework 150 may receive input from the user indicating first areas of concentrated vegetation within test image 1700 as first test patches, and receive input from the user assigning a high vegetation category to the first test patches. Training framework 150 may further receive input from the user indicating second areas of non-vegetation within test image 1700 as second test patches, and receive input from the user assigning the vegetation-free category to the second test patches. Training framework 150 may receive input for test patches that are assigned a low vegetation category or another type of category.

In another example, the type of site contamination may comprise erosion, and the terrain texture categories may include a high erosion category and an erosion-free category. Training framework 150 may receive input from the user indicating first areas of concentrated erosion within test image 1700 as first test patches, and receive input from the user assigning a high erosion category to the first test patches. Training framework 150 may further receive input from the user indicating second areas of non-erosion within test image 1700 as second test patches, and receive input from the user assigning the erosion-free category to the second test patches. Training framework 150 may receive input for test patches that are assigned a low erosion category or another type of category.

With the desired number of test patches 1801-1803 defined, training framework 150 trains patch classification model 514 based on the test patches 1801-1803 (step 1608 in FIG. 16). For example, training framework 150 may send the test patches 1801-1803 to platform controller 430 in aerial platform 180. Training framework 150 may send the test patches 1801-1803 to platform controller 430 via wireless signals through communication interface 402 while aerial platform 180 is airborne. Alternatively, training framework 150 may send the test patches 1801-1803 to platform controller 430 via wired signals through communication interface 402, such as when aerial platform 180 has landed. Also, as described above, training framework 150 and/or user interface 117 may be installed onboard aerial platform 180 in other embodiments. In response to the test patches 1801-1803, classification element 504 (see FIG. 5) is configured to build the patch classification model 514 with test patches 1801-1803. The training method 1600 may be used to initially train the patch classification model 514, and may be used intermittently to further train the patch classification model 514.

The training method 1600 is beneficial in that intense labeling of every pixel on a test image 1700 is not required. And, the user is not required to annotate a large number (e.g., thousands) of test images to train the patch classification model 514. The user may define a relatively small number of test patches 1801-1803 to represent the types of textures desired for inspection. Thus, the burden on the user in training the patch classification model 514 is limited.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An unmanned aerial inspection system, comprising:
an aerial platform comprising an imaging device, and at least one processor and at least one memory that:
navigate the aerial platform to a location of a geographic region;
capture a digital image of the geographic region with the imaging device while the aerial platform is airborne;
segment the digital image into superpixels;
select a region of interest from the digital image to define one or more patches associated with the superpixels;
assign terrain texture categories to the patches;
assign the terrain texture categories to the superpixels based on the terrain texture categories of the patches to generate a texture classified representation of the digital image;
determine whether a site contamination is present at the geographic region based on the texture classified representation of the digital image; and
report an alert upon determining that the site contamination is present.

2. The unmanned aerial inspection system of claim 1 wherein the at least one processor and at least one memory:
designate one or more of the terrain texture categories as a site contamination category;
identify a percentage of the superpixels in the texture classified representation that are assigned the site contamination category; and
determine that the site contamination is present at the geographic region when the percentage exceeds a threshold.

3. The unmanned aerial inspection system of claim 1 wherein the at least one processor and at least one memory:
designate one or more of the terrain texture categories as a site contamination category;
identify a total number of the superpixels in the texture classified representation that are assigned the site contamination category; and
determine that the site contamination is present at the geographic region when the total number exceeds a threshold.

4. The unmanned aerial inspection system of claim 1 wherein the at least one processor and at least one memory assign the terrain texture categories to the superpixels by:

for each individual superpixel of the superpixels,
identifying pixels in the individual superpixel that belong to at least one of the patches;
identifying one or more of the terrain texture categories assigned to each of the pixels; and
assigning one of the terrain texture categories that is assigned to a majority of the pixels as a terrain texture category for the individual superpixel.

5. The unmanned aerial inspection system of claim 1 wherein:
the at least one processor and at least one memory assign the terrain texture categories to the patches based on a patch classification model; and
the at least one processor and at least one memory:
present one or more test images to a user;
receive input from the user indicating areas in the test images as test patches;
receive input from the user assigning one of the terrain texture categories to the test patches; and
train the patch classification model based on the test patches.

6. The unmanned aerial inspection system of claim 5 wherein:
the site contamination comprises vegetation encroachment, and the terrain texture categories include at least a high vegetation category and a vegetation-free category;
the at least one processor and at least one memory receive input from the user indicating first areas of concentrated vegetation within the test images as first test patches, and receive input from the user assigning the high vegetation category to the first test patches; and
the at least one processor and at least one memory receive input from the user indicating second areas of non-vegetation within the test images as second test patches, and receive input from the user assigning the vegetation-free category to the second test patches.

7. The unmanned aerial inspection system of claim 5 wherein:
the site contamination comprises erosion, and the terrain texture categories include at least a high erosion category and an erosion-free category;
the at least one processor and at least one memory receive input from the user indicating first areas of concentrated erosion within the test images as first test patches, and receive input from the user assigning the high erosion category to the first test patches; and
the at least one processor and at least one memory receive input from the user indicating second areas of non-erosion within the test images as second test patches, and to receive input from the user assigning the erosion-free category to the second test patches.

8. The unmanned aerial inspection system of claim 1 wherein the at least one processor and at least one memory:
send an alert message via wireless signals while the aerial platform is airborne when the site contamination is present.

9. The unmanned aerial inspection system of claim 1 wherein the at least one processor and at least one memory:
send an alert message via wireless signals while the aerial platform is airborne that a high vegetation contamination is present at the geographic region such that a vegetation removal service can be directed to the location of the geographic region.

10. The unmanned aerial inspection system of claim 1 wherein the aerial platform is one of a rotary-wing Unmanned Aerial Vehicle (UAV) and a fixed-wing UAV.

11. A method of performing a site inspection, the method comprising:
navigating an aerial platform to a location of a geographic region;
capturing a digital image of the geographic region with an imaging device onboard the aerial platform while the aerial platform is airborne;
segmenting the digital image into superpixels at the aerial platform;
selecting a region of interest from the digital image to define one or more patches associated with the superpixels;
assigning terrain texture categories to the patches;
assigning the terrain texture categories to the superpixels based on the terrain texture categories of the patches to generate a texture classified representation of the digital image;
determining whether a site contamination is present at the geographic region based on the texture classified representation of the digital image; and
reporting an alert upon determining that the site contamination is present.

12. The method of claim 11 wherein determining whether a site contamination is present comprises:
designating one or more of the terrain texture categories as a site contamination category;
identifying a percentage of the superpixels in the texture classified representation that are assigned the site contamination category; and
determining that the site contamination is present at the geographic region when the percentage exceeds a threshold.

13. The method of claim 11 wherein determining whether a site contamination is present comprises:
designating one or more of the terrain texture categories as a site contamination category;
identifying a total number of the superpixels in the texture classified representation that are assigned the site contamination category; and
determining that the site contamination is present at the geographic region when the total number exceeds a threshold.

14. The method of claim 11 wherein assigning the terrain texture categories to the superpixels comprises:
for each individual superpixel of the superpixels,
identifying pixels in the individual superpixel that belong to at least one of the patches;
identifying one or more of the terrain texture categories assigned to each of the pixels; and
assigning one of the terrain texture categories that is assigned to a majority of the pixels as a terrain texture category for the individual superpixel.

15. The method of claim 11 wherein:
assigning the terrain texture categories to the patches comprises assigning the terrain texture categories to the patches based on a patch classification model; and
the method further comprises:
presenting one or more test images to a user;
receiving input from the user indicating areas in the test images as test patches;
receiving input from the user assigning one of the terrain texture categories to the test patches; and
training the patch classification model based on the test patches.

16. The method of claim 15 wherein:

the site contamination comprises vegetation encroachment, and the terrain texture categories include at least a high vegetation category and a vegetation-free category; and receiving input from the user comprises:

receiving input from the user indicating first areas of concentrated vegetation within the test images as first test patches;

receiving input from the user assigning the high vegetation category to the first test patches;

receiving input from the user indicating second areas of non-vegetation within the test images as second test patches; and receiving input from the user assigning the vegetation-free category to the second test patches.

17. The method of claim 15 wherein:

the site contamination comprises erosion, and the terrain texture categories include at least a high erosion category and an erosion-free category;

receiving input from the user comprises:

receiving input from the user indicating first areas of concentrated erosion within the test images as first test patches;

receiving input from the user assigning the high erosion category to the first test patches;

receiving input from the user indicating second areas of non-erosion within the test images as second test patches; and receiving input from the user assigning the erosion-free category to the second test patches.

18. The method of claim 11 wherein reporting an alert upon determining that the site contamination is present comprises:

sending an alert message via wireless signals while the aerial platform is airborne when the site contamination is present.

19. The method of claim 11 wherein reporting an alert upon determining that the site contamination is present comprises:

sending an alert message via wireless signals while the aerial platform is airborne that a high vegetation contamination is present at the geographic region such that a vegetation removal service can be directed to the location of the geographic region.

20. A unmanned aerial inspection system, comprising:

an Unmanned Aerial Vehicle (UAV);

an imaging device on the UAV; and a platform controller on the UAV comprising at least one processor and at least one memory that:

navigate the UAV to a location of a geographic region;

capture a digital image of the geographic region with the imaging device while the UAV is airborne; and process the digital image while the UAV is airborne to:

segment the digital image into superpixels;

select a region of interest from the digital image to define one or more patches associated with the superpixels;

assign terrain texture categories to the patches;

assign the terrain texture categories to the superpixels based on the terrain texture categories of the patches to generate a texture classified representation of the digital image;

determine whether a vegetation encroachment is present at the geographic region based on the texture classified representation of the digital image; and send an alert message via wireless signals while the UAV is airborne to report when the vegetation encroachment is present.

* * * * *